May 15, 1951     E. W. GRAHAM     2,553,248
CENTERING MEANS FOR RESTRAINING DEVICES
Filed June 20, 1945
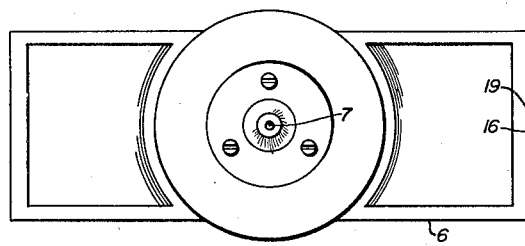
Fig. 1.
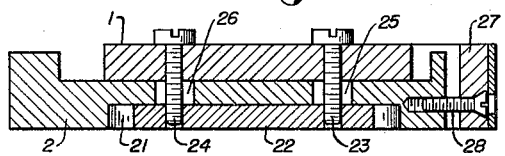
Fig. 3.
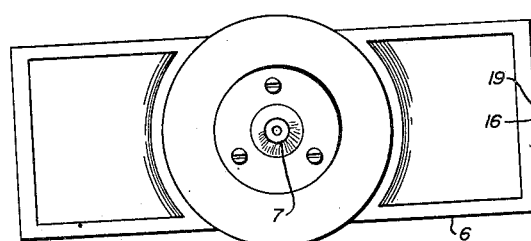
Fig. 2.
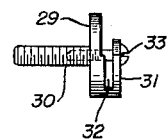
Fig. 4.   Fig. 5.
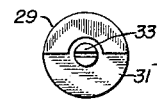
Fig. 6.
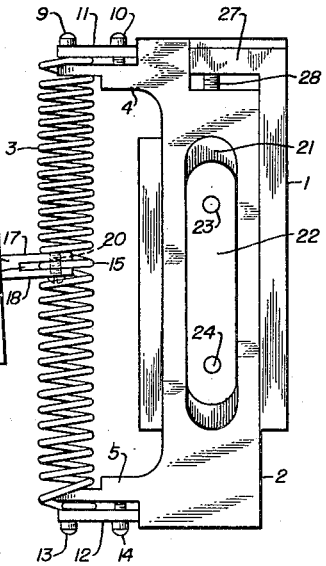
INVENTOR.
ERWIN W. GRAHAM
BY
Frank H. Harmon
ATTORNEY Patented May 15, 1951

2,553,248

UNITED STATES PATENT OFFICE 2,553,248

CENTERING MEANS FOR RESTRAINING DEVICES

Erwin W. Graham, Lakewood, Ohio, assignor, by mesne assignments, to Jack & Heintz Precision Industries, Inc., Cleveland, Ohio, a corporation of Delaware Application June 20, 1945, Serial No. 600,581

4 Claims. (Cl. 267—1)

This invention relates to devices for resiliently constraining a pivoted instrumentality in a predetermined position about its axis and has for one of its objects to provide a simple, efficient and positive support for the ends of a coil spring wherein the distortion of the spring at its points of connection to the suspension device is reduced to a minimum.

Another object is to provide such a spring constraining device with means by which the spring rate for returning the instrumentality to a normal attitude may be adjusted to an exact value.

A further object is to provide such a device in which the spring force is proportional to the displacement of the spring and in which the positive return of the spring center to zero position with respect to the pivot axis of the device to which it is connected to resiliently constrain it in a predetermined neutral position will be insured.

A still further object is to provide in such a device a means of attachment for the coil spring intermediate its ends to the pivoted instrumentality whose position it is desired to constrain and a means of adjustment of the coil spring end connections to center the spring forces with respect to the pivoted instrumentality for resiliently constraining the same in a normal predetermined neutral position about its pivot axis.

Among other applications for such a device one of the outstanding ones is its use in connection with gyroscopic devices and particularly gyro rate of turn instruments and automatic pilot turn control devices and the like. In such high precision devices it is of utmost importance that the spring means, used for biasing, loading or neutralizing the movement relative to the casing moves with the airplane and the gimbal frame suspension for the gyro rotor, exerts a uniform resilient force in both directions which result cannot be obtained unless the forces of the coil spring secured to the casing and the gimbal frame are absolutely centered with respect to a given plane of disposition of the gimbal frame about its axis.

With the foregoing and other objects in view, the invention resides in the combination of parts and in the details of construction and operation hereinafter set forth in the following specification and appended claims, certain embodiments thereof being illustrated in the accompanying drawings, in which:

Figure 1 shows a coil spring adjustably disposed between the ends of a slidably adjustable bracket and a rotatable gimbal frame with a bracket releasably and adjustably connected to the coil spring midway of its two ends, the gimbal frame being shown in a position neutral, or normal to the coil spring;

Figure 2 is a similar view showing the gimbal frame in a position at an upward angle to normal with the upper portion of the spring in a corresponding relative degree of compression and the lower portion relatively in tension;

Figure 3 is a view in section taken along line 3—3 of Figure 1, showing the slidably adjustable bracket;

Figure 4 is a side view of a modified form of spring engaging and supporting stud;

Figure 5 is a view in elevation of the stud of Figure 4; and

Figure 6 is a detail top plan view of one of the spring end attaching means of Figure 1.

Referring more particularly to the drawings, Figures 1, 2 and 3 show one form of the invention in which stationary support 1, preferably made of brass, is suitably secured to some stationary frame. The adjustable bracket 2 is supported by support 1 to be slidable therein for adjustment purpose. The coil spring 3 itself is in one piece and comprises originally a continuous series of uniform concentric convolutions. The problem is to releasably attach the two ends of the coil spring to the two end arms 4 and 5 of bracket 2, preferably of steel, and provide means for also releasably attaching the gimbal frame 6, rotatable about an axis 7, to the spring midway of its length in such a manner as to normally resiliently constrain the gimbal frame to be normal to the spin axis of the gyro rotor it supports, and to maintain the coil spring normally straight from end to end and to center the forces of the coil spring with respect to the gimbal frame so as to resiliently constrain the latter in a given position about its pivot axis.

In order to accomplish this the arms 4 and 5 are tapered in thickness, leaving a ledge of tapering thickness, such a ledge 8 being shown in connection with arm 5 in Figure 6. Each arm 4 and 5 is provided with screw holes to respectively receive screw bolts 9 and 10 and 13 and 14 which also extend through removable plates 11 and 12 to hold such plates in adjustable spaced relation with arms 4 and 5. One or more convolutions of each end of the spring are then wound about their corresponding screw bolts 9 and 13 between arm 5 and plate 12. In this connection the oppositely helically tapered thicknesses of arms 4 and 5 assist in securing the springs ends in position with the minimum amount of distortion. The connection of the spring end is adjustable by reason of the longitudinal adjustability of plates 11 and 12 with respect to each other and by the manual threading of the convolutions of the spring ends about pins 9 and 13 between arm 4 and plate 11 and between arm 5 and plate 12.

At a point intermediate the two ends of the coil spring the spring is distended longitudinally to provide one or more slightly elongated convolutions such as 15 which are threaded into a groove 16 between walls 17 and 18 of a bracket 19 and about a screw bolt 20 extending through bracket walls 17 and 18 across groove 16. This bracket 19 may be either integral with or removably secured to the gimbal frame 6.

In order to center the spring and its connection to bracket 19 to resiliently constrain the gimbal frame in a given plane about its pivot axis to normally maintain the gimbal frame normal to the spin axis of the gyro rotor as the spring is centered and the gimbal frame is in its normal position of Figure 1, the spring supporting bracket 2 is made longitudinally slidably adjustable in the stationary support 1 which has one side wall channeled to receive bracket 2 and one side wall of the bracket is channeled at 21 to removably receive a plate 22. Support 1 and plate 22 have screw holes to receive and engage the threads of screw bolts 23 and 24 which also extend through elongated slots 25 and 26 in bracket 2. The end wall 27 of the stationary support has a countersunk hole to receive a screw bolt 28 against displacement. Bolt 28 passes therethrough into engagement with aligned screw holes in the spaced adjacent end of bracket 2. Thus a turning of bolt 28 in one direction or the other causes bracket 2 to be bodily slidably moved in support 1, which movement is permitted by the elongated slots 25 and 26 through which bolts 23 and 24 extend.

The sequence of assembly may be to thread the two distended end convolutions of the spring in the spaces between arm 4 and plate 11 and arm 5 and plate 12 and about bolts 9 and 13. The distended convolution 15 is threaded into bracket 19 about bolt 20. This places the coil spring including the distended end and intermediate convolutions as well as the remaining main spaced normal coil portions under an initial longitudinal tension, while the adjustment of bracket 2 in support 1 centers the spring with respect to a given attitude of the gimbal about its axis to normally maintain the gimbal normal to the spin axis of the rotor it supports. It is to be borne in mind that the threading of the distended convolutions in their brackets, in itself, renders the arrangement an adjustable one. Once the proper adjustment is made insofar as the threading is concerned solder or other expedients may be employed to make such adjustment relatively permanent, or instead, the tension thus set up may be relied upon to hold the convolutions in their adjusted positions, as desired.

Figure 1 shows the coil spring absolutely centered with respect to the gimbal frame and the latter in a position normal to the spin axis of the rotor that it is adaped to support. It is clear that any deviation of this relationship by reason of relative rotation of gimbal frame 6 about its axis 7 in either direction will be resiliently resisted in compression and tension by the coil spring. For instance, Figure 2 shows the gimbal frame to have been relatively rotated counterclockwise to an extent of approximately 3°. Although the coil spring is initially under tension, as in Figure 1, its lower portion in Figure 2 is thus placed in greater tension and its upper portion relatively in compression. This energy thus stored up acts to restore the relationship shown and described in connection with Figure 1, as is the case in the usual rate gyroscopic devices including attitude indicating instruments and automatic steering and equilibrium control devices. The importance, however, of the centering means for the coil spring including positive supports for the spring ends to be adjustably threaded therein and wherein the spring distortion is retained at a minimum cannot be too greatly emphasized in connection with such high precision gyroscopic devices inasmuch as only by such adjustable centering means may uniform and gaugeable spring balancing and returning forces be obtained, the spring rate to be adjusted to exact value and the spring force be proportional to displacement to insure a positive and accurate return of center to zero position.

An alternate form of means of attachment of the spring ends to a support is shown in Figures 4 and 5 and comprises a bracket 29 with a screw shank 30 rigid therewith. The bracket has its upper half of lesser thickness than its lower half and integral and spaced from the main part of the bracket is a parallel extension 31 with its upper part removed leaving a groove 32 between the bracket and its spaced extension. Through the extension 31, the bracket 29 and a portion of shank 30 extends a screw bolt 33. One or more convolutions of each end of spring 3 is wound about screw bolt 33 and threaded into groove 32 to be retained therein by spring tension alone or soldered therein, as desired. Such a form of end attachment may be used directly on a stationary frame or be used to connect the ends of the coil spring to the arms 4 and 5 of support 2 of Figures 1, 2 and 3, as desired.

I claim:

1. In a device for resiliently constraining an object pivotally mounted about a stationary support against movement about its axis in either direction from a normal neutral position, a stationary frame and a slidably adjustable support carried thereby, a coil spring connected intermediate of its ends to said pivoted object and having its two ends connected to said adjustable support and means for longitudinally adjusting said adjustable support with said spring with respect to its point of attachment to said pivoted object to center said spring with respect thereto.

2. In a device for resiliently constraining an object pivotally mounted about a stationary support against movement about its axis in either direction from a normal neutral position comprising a coil spring with its ends mounted to place the spring under tension, a stationary frame and a slidably adjustable support carried thereby, said spring being connected intermediate of its ends to said pivoted object, means for adjustably securing the two ends of said spring to said adjustable support to predetermine the spring tension, a bracket carried by said pivoted object connected to said spring intermediate its ends and means for adjusting said spring lengthwise with respect to its point of attachment to said bracket to center said spring with respect thereto.

3. In a device for resiliently constraining an object pivotally mounted about a stationary support against movement about its axis in either direction from a normal neutral position comprising a rigid frame, a coil spring with its ends connected to said rigid frame to place the spring under tension, said spring being connected intermediate of its ends to said pivoted object, one or more of the convolutions of said coil spring intermediate its ends being distended longitudinally and concentrically, a bracket carried by said pivoted object comprising a pair of spaced members between which said intermediate convolutions are held by said bracket, said coil spring having one or more convolutions at each end relatively distended longitudinally and concentrically, a bracket on each end of said rigid frame for engaging the distended convolutions of each spring extremity and each having spaced walls with a groove therebetween to adjustably receive said end convolutions between said walls to adjust the tension of said spring and means for adjusting the clamping action of the two ends of said rigid frame on the two ends of said spring for centering the spring with respect to the pivoted object so as to normally resiliently maintain the same in a predetermined position with respect to its pivotal axis.

4. In a device for resiliently constraining an object pivotally mounted about a stationary support against movement about its axis in either direction from a normal neutral position comprising a stationary frame and a support slidably adjustable thereon, a coil spring having its ends connected to said adjustable support to place the spring under tension, said spring being connected intermediate of its ends to said pivoted object, one or more of the convolutions of said coil spring intermediate its ends being distended longitudinally and concentrically, a bracket carried by said pivoted object comprising a pair of spaced members between which said intermediate convolutions are held by said bracket, said coil spring having one or more convolutions at each end relatively distended longitudinally and concentrically, a bracket on each end of said rigid frame for engaging the distended convolutions of each spring extremity and each having spaced walls with a groove therebetween to adjustably receive said end convolutions between said walls to adjust the tension of said spring and means for adjusting said slidably adjustable support for centering the spring lengthwise with respect to the pivoted object so as to normally resiliently maintain the same in a predetermined position with respect to its pivotal axis.

ERWIN W. GRAHAM.

REFERENCES CITED

The following references are of record in the file of this patent:

UNITED STATES PATENTS

| Number | Name | Date |
| --- | --- | --- |
| 937,346 | Webster | Oct. 19, 1909 |
| 1,280,219 | Hayman | Oct. 1, 1918 |
| 1,494,845 | Kerrick | May 20, 1924 |
| 1,953,664 | Walker | Apr. 3, 1934 |
| 2,168,148 | Arehart | Aug. 1, 1939 |